(No Model.)

C. L. LEWIS.
COCKEYE AND CLIP.

No. 251,369. Patented Dec. 27, 1881.

WITNESSES
A. P. Robertson
R. Robertson

INVENTOR
Charles L. Lewis
BY T. W. Robertson
Attorney

UNITED STATES PATENT OFFICE.

CHARLES L. LEWIS, OF STANTON, MICHIGAN.

COCKEYE AND CLIP.

SPECIFICATION forming part of Letters Patent No. 251,369, dated December 27, 1881.

Application filed August 4, 1881. (No model.)

*To all whom it may concern:*

Be it known that I, CHARLES L. LEWIS, a citizen of the United States of America, residing at Stanton, in the county of Montcalm and State of Michigan, have invented certain new and useful Improvements in Cockeyes and Clips; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to an improvement in cockeyes and clips, whereby the cockeye can be readily detached by turning it round at an angle to its normal position; and it consists in the peculiar construction and arrangement of parts, hereinafter more fully described, and then pointed out in the claim.

Figure 1:
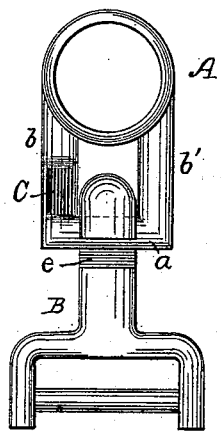
Figure 2:
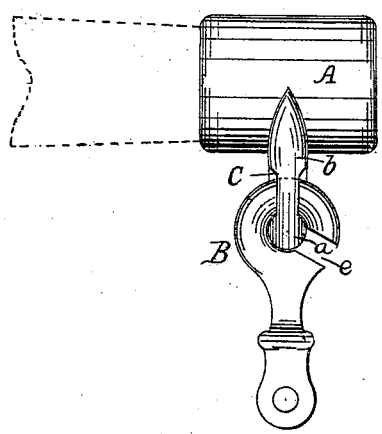
Figure 3:
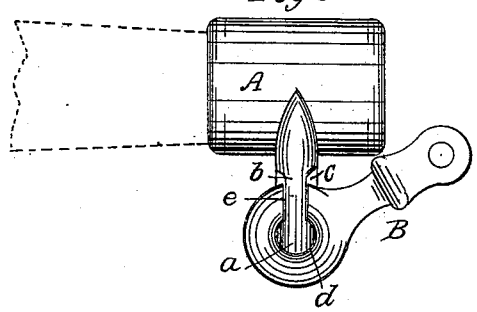
Figure 4:
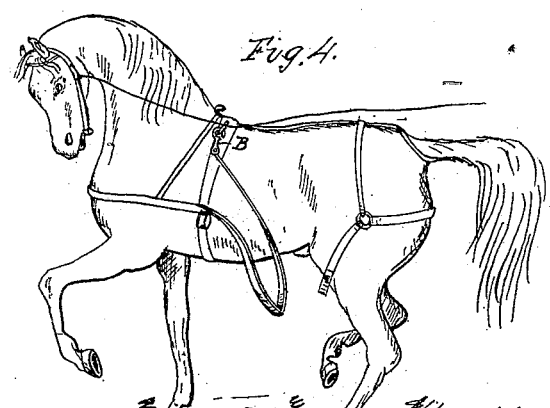

Figure 1 represents a side view of a clip and cockeye constituted according to my proposed improvements; Fig. 2, a plan of the same in its normal position; Fig. 3, a similar view, with the cockeye in position to be readily removed; and Fig. 4 shows the use of the cockeye as a hook to hang the traces when the horse is removed from the vehicle.

A represents the clip provided with a square loop, consisting of a round pin, $a$, connected to the clip by side bars, $b\ b'$, the whole being preferably cast in one piece. At each side of the bar $b$ is a notch, C, the purpose of which will hereinafter be more fully set forth.

B represents the cockeye, one end of which may be of the usual form, but the other end has a circular orifice, $d$, and a slot, $e$. When in use the cockeye assumes the position shown in Figs. 1 and 2, in which position it cannot accidentally become unfastened; but when it is desired to remove the trace it is only necessary to turn the cockeye in the position shown in Fig. 3, when it can be readily removed. Besides this advantage of easy removal, the pin $a$ can be made of the same size as the orifice in the cockeye, and thus shaking and rattling are prevented. Furthermore, the peculiar form of the cockeye admits of its being used as a hook to hang the trace to any loop, ring, or buckle on the harness when the animal wearing it is being removed from the vehicle, as shown in Fig. 4.

It is obvious that instead of a notch on each side of the bar $b$ a single notch on one side may be used.

I am aware of the Patent No. 190,007, granted April 24, 1877, to J. C. Coonley, which shows a whiffletree-hook provided with an opening, and adapted to be coupled to and uncoupled from the whiffletree-clip; but in this invention the hook is only adapted to be coupled to and uncoupled from the clip before the clip is fastened to the whiffletree, as is clearly described in the specification of said patent, and the hook is especially constructed to be detached from the trace.

My invention differs from and is advantageous over the above-mentioned device, in having the cockeye or hook permanently fastened to the trace, and in being constructed to allow its removal from the clip when in use, whereby the trace can be easily detached from the whiffletree, and the hook or cockeye so removed forms a means of suspending the trace from any part of the harness.

As the hook in the patent above mentioned cannot be removed from the clip without removing the clip from the whiffletree, it is evident that the hook cannot be used for suspending the end of the trace, as in my invention. Furthermore, my invention allows of a perfectly-round orifice being made in the cockeye, which hole can be made to accurately fit the round cross-bar of the whiffletree-clip, thereby preventing shaking and rattling.

What I claim as new is—

The whiffletree-clip A, having a loop formed of two side bars, $b\ b$, one of which is provided with a reduced portion, and a cross-bar connecting them, which is round in cross-section, in combination with the cockeye B, provided with a closely-fitting orifice, $d$, and a slot $e$, opening into said orifice, adapted to receive the reduced portion of the side bar, all constructed and arranged substantially as shown and described, whereby the cockeye may be accurately fitted to the loop of the clip, and yet readily removed therefrom without removing the clip from the whiffletree.

In testimony whereof I affix my signature in presence of two witnesses.

CHARLES L. LEWIS.

Witnesses:
 T. F. SHIELDS,
 C. ELLIS ELLIOT.